United States Patent [19]

Ito

[11] Patent Number: 4,577,989
[45] Date of Patent: Mar. 25, 1986

[54] BALL JOINT

[75] Inventor: Eiichi Ito, Meerbusch, Fed. Rep. of Germany

[73] Assignee: TRW Ehrenreich GmbH & Co. KG, Dusseldorf, Fed. Rep. of Germany

[21] Appl. No.: 624,300

[22] Filed: Jun. 25, 1984

[30] Foreign Application Priority Data

Jul. 23, 1983 [DE] Fed. Rep. of Germany ....... 3326586

[51] Int. Cl.⁴ .............................................. F16C 11/06
[52] U.S. Cl. .................................. 403/140; 403/135; 403/39
[58] Field of Search ............... 403/135, 140, 136, 139, 403/132, 133, 39

[56] References Cited

U.S. PATENT DOCUMENTS 3,220,755 11/1965 Gottschald et al. ................. 403/136
3,233,929 2/1966 Herbenar ............................ 403/140

FOREIGN PATENT DOCUMENTS 1826871 12/1960 Fed. Rep. of Germany .
1098381 1/1961 Fed. Rep. of Germany .
1907215 11/1969 Fed. Rep. of Germany .
1916579 10/1970 Fed. Rep. of Germany .
1932520 1/1971 Fed. Rep. of Germany .
1775151 5/1971 Fed. Rep. of Germany .
2057513 6/1972 Fed. Rep. of Germany .
2434490 7/1974 Fed. Rep. of Germany .
7624430 8/1976 Fed. Rep. of Germany .
725724 3/1955 United Kingdom ................ 403/133
920925 3/1963 United Kingdom ................ 403/140

Primary Examiner—Andrew V. Kundrat
Attorney, Agent, or Firm—Young & Tarolli

[57] ABSTRACT

The subject of the invention is a ball joint for motor vehicles comprising a bearing insert (4) located between a joint housing (1) and a ball head (3). The bearing insert is provided with meridionally extending slots (9) arranged in a half-portion gripping of the ball head over the equator. A clamping ring (5) located in the housing grips the tongues (10) of this bearing insert (4). To improve the elasticity of the bearing parts while retaining a good distribution of lubricant, the clamping ring (5) is provided with circumferential grooves (13) on its inner surface and with openings (15) in the outer end surface (14).

3 Claims, 6 Drawing Figures

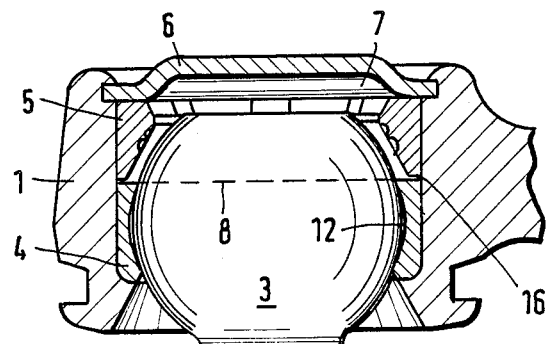
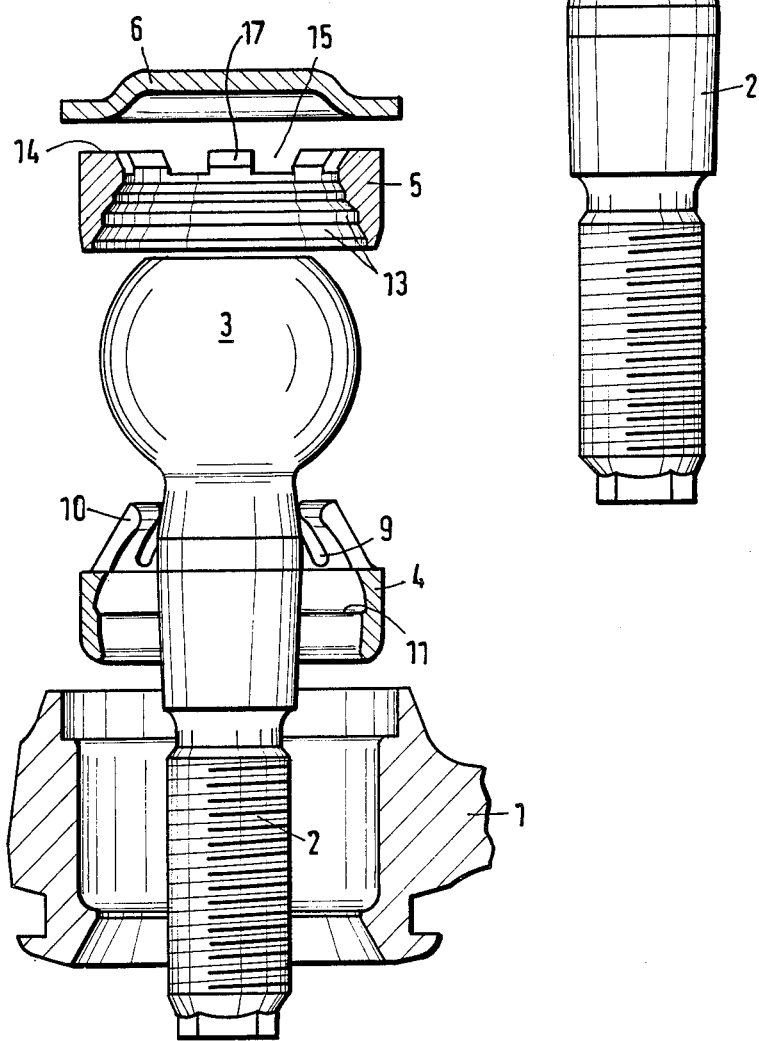

BALL JOINT

The subject of the invention relates to a ball joint for motor vehicles. The ball joint comprises a bearing insert located between a joint housing and the ball head and gripping the ball head over its equator, the bearing insert comprising slots extending meridionally and tongues, and a clamping ring clamping the tongues of the bearing insert.

German Pat. No. 2,434,490 discloses a ball joint with two semispherical bearing inserts wherein one of these two bearing inserts is provided at the inside with a thin inner insert of hard elastic rubber. Thus, the bearing assembly consists as a whole, of three semi-spherical bearing inserts. Moreover, the bearing inserts abut each other in the equatorial plane of the ball head. To provide for abutting the bearing inserts in the equatorial plane of the ball head, the housing must be manufactured with close tolerances.

German Utility Model No. 1,826,871 discloses a ball joint for motor vehicles with a bearing insert located between the joint housing and the ball and gripping the ball head over the equator. The bearing insert is provided with slots running meridionally and tongues. A clamping ring clamps the tongues of the bearing insert. The clamping ring may be screwed into the open end of the joint housing, and may be tightened with different strength over the tongues of the bearing insert, so as to be able to vary the ease of movement of the ball joint. A disadvantage of this known ball joint consists in that the clamping ring is not secured against loosening in the joint housing.

German Utility Model disclosure No. 76 24 430 discloses a ball joint for motor vehicles in which the joint housing is provided on one side of the equatorial plane with slots running in the meridional direction, and on its outer side, forms a cone, which is clamped by a corresponding clamping plastic ring. By means of a circumferential flange, the housing can be fastened, with interposition of adjusting shims, to a plate, the thickness of the shim determining the compression force applied by the clamping ring against the tongues of the housing.

German Application No. 1,907,215 discloses a ball joint with a bearing insert located between the joint housing and the ball head and having slots running meridionally. Clamping rings are located on both sides, of which one ring also clamps over the tongues of the bearing insert.

Finally, German Application No. 2,057,513 discloses another ball joint that includes bearing inserts located between the joint housing and the ball head and having slots running in a meridional direction. In this application, no clamping rings are provided.

The present invention solves the problem of providing a simply constructed ball joint which, while insuring a good distribution of lubricant, permits larger manufacturing tolerances of the joint housing to be used, so that, under mass production, despite different axial stress in the assembled joint, the most possible equalized tilting moment is obtained.

The object of the invention is achieved by providing the clamping ring of the ball joint, with circumferential grooves on its inner surface and, with notches on its outer end surface.

In a ball joint designed according to the invention, the bearing insert and the clamping ring do not abut each other, but, rather, are pushed one over the other in a wedge fashion over a relatively large zone, so that upon axial stressing of the ball joint, manufacturing tolerances of the joint housing can be overlapped, without exceeding the allowable magnitude of deviation of the tilting moment. This effect is improved by the fact that the clamping ring is provided on its inner surface with circumferential grooves and on its outer end surface with openings. The meridionally extending slots of the bearing insert and the circumferential grooves of the clamping ring form a crossing system of hollow spaces which offer, on the one hand, a possibility of escape for the excess material of the bearing insert and the clamping ring in the case, for example, of a joint housing which is somewhat too small, and on the other hand, forms a labyrinth of lubricant grooves, surrounding the ball head in one equatorial half, which makes possible an ideal distribution of a lubricant.

In an embodiment of a ball joint designed according to the invention, the bearing insert lies against the ball head and is exposed to wear, it can suitably be produced from a hard elastic plastic, for example, polyoxymethylene (POM), and the clamping ring can suitably be made from a soft elastic plastic, for example, polyurethane (PUR). In connection with the construction of the bearing insert and the clamping ring according to the invention, this pairing of materials makes possible an ideal utilization of the effects according to the invention, while the clamping ring performs the function of a buffer.

Other details and advantages of the subject invention follow from the description below and respective drawings. In the drawings:

FIG. 1 shows a longitudinal cross section of a ball joint assembly;

FIG. 2 shows the parts of the ball joint assembly;

Figure 3:
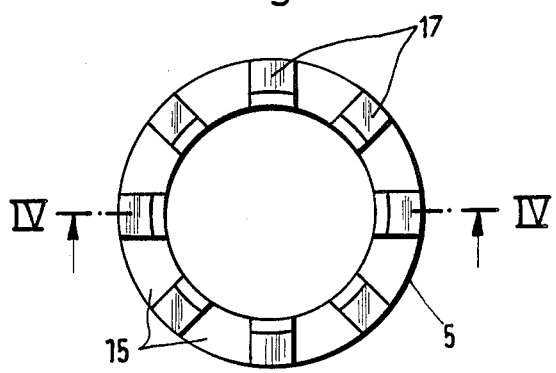
FIG. 3 shows a top view of the clamping ring.
Figure 4:
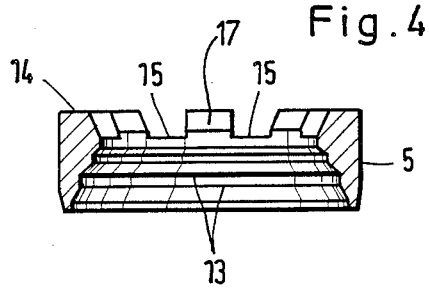
FIG. 4 shows the cross section along the line IV—IV in FIG. 3 of the clamping ring.
Figure 5:
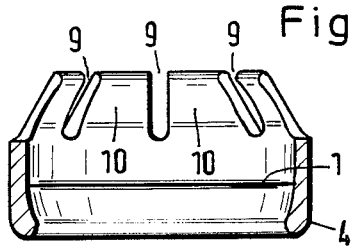
FIG. 5 shows in cross section along the line V—V in FIG. 6 of the bearing insert.
Figure 6:
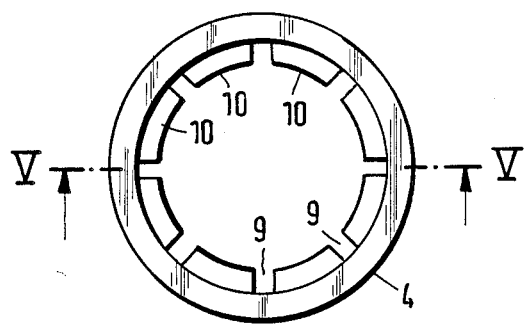
FIG. 6 shows bottom view of the bearing insert.

In a joint housing 1, is arranged a stud 2 with a ball head 3, with interposition of a bearing insert 4 and a clamping ring 5. At its upper side, the ball joint is closed with a rolled-in cap 6, under which is located a grease reservoir 7.

The bearing insert 4, lying against the ball head 3, is provided above an imaginary equator 8, with slots 9, which form between them elastic tongues 10, which have a wall thickness less than the wall thickness of the lower part of the bearing insert 4. To increase the elasticity of the lower part of the bearing insert 4, a circumferential fold is provided, approximately in the middle of the lower part, which, in the assembled condition, forms a circumferential lubricant pocket 12.

The clamping ring 5 is wedge-shaped in cross section, and has on its inner surface, circumferential grooves 13. At its upper end surface 14, the clamping ring 5 is provided with notches 15 defined by axially extending projections 17 in the form of annular segments. The inner edges of projections 17 are beveled.

When assembling the ball joint, the clamping ring 5, wedge-shaped in cross section, is pushed over the slotted zone of the bearing insert. Thus, the excess material of the bearing insert 4 and the clamping ring 5 can be extruded into the hollow spaces formed by the slots 9 and the grooves 13. The cross section of the bearing insert 4 and of the clamping ring 5 is such that when the parts are mounted in the joint housing 1, abutment thereof in the plane of the equator 8 is avoided, and a small gap 16 is always maintained.

By providing notches 15 defined by axially extending projections 17 in the form of annular segments and beveling the edges of the projections, the elasticity of the clamping ring 5 is further improved, so that even relatively larger manufacturing tolerances of the joint housing 1 can be compensated without exceeding the limits of the allowable tilting moment.

As a result, the invention provides a ball joint which has an ideal distribution of lubricant and because of its especially easy functioning, has a long useful life.

I claim:

1. A ball joint for a vehicle comprising:
    a housing for receiving a ball head,
    a bearing insert disposed between said housing and said ball head, said bearing insert having a body portion engaging said ball head on one side of the equatorial plane thereof and axially extending tongues defining slots therebetween and gripping said ball head on the other side of the equatorial plane thereof, and
    a clamping ring supported in said housing in surrounding relationship with respect to said tongues,
    the inner surface of said clamping ring and the outer surface of said tongues defining complimentary conical surfaces,
    said clamping ring having circumferentially extending grooves on the inner surface thereof and axially extending projections in the form of annular segments on the outer surface thereof engaging said housing to thereby provide for prestressing said ball joint.

2. A ball joint according to claim 1 wherein the inner edges of said axially extending projections are bevelled.

3. Ball joint according to claims 1 or 2, wherein the bearing insert is made of a hard elastic plastic, for example, polyoxymethylene (POM), and the clamping ring is made, for example, of a soft elastic plastic, for example, polyurethane (PUR).

* * * * *